(12) United States Patent
Ferguson et al.

(10) Patent No.: US 11,654,935 B2
(45) Date of Patent: May 23, 2023

(54) ADJUSTABLE AUTOMATIC WINDOW TINTING FOR AUTONOMOUS VEHICLES

(71) Applicant: GM Cruise Holdings LLC, San Francisco, CA (US)

(72) Inventors: Kenneth Ramon Ferguson, Scottsdale, AZ (US); Samuel Harrison Glidden, Phoenix, AZ (US); Maximilian Gerrit Euchenhofer, Phoenix, AZ (US); Jeffrey Brandon, Phoenix, AZ (US); Michael Frank Schmidt, Scottsdale, AZ (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 257 days.

(21) Appl. No.: 17/089,969

(22) Filed: Nov. 5, 2020

(65) Prior Publication Data

US 2022/0135073 A1     May 5, 2022

(51) Int. Cl.
| | | |
|---|---|---|
| *B60W 30/00* | (2006.01) | |
| *B60W 60/00* | (2020.01) | |
| *B60J 1/02* | (2006.01) | |
| *B60J 1/08* | (2006.01) | |
| *B60J 1/18* | (2006.01) | |
| *B60J 3/04* | (2006.01) | |
| *G01C 21/34* | (2006.01) | |
| *G02F 1/163* | (2006.01) | |
| *G05B 19/4155* | (2006.01) | |
| *G06Q 50/30* | (2012.01) | |

(Continued)

(52) U.S. Cl.
CPC ............ *B60W 60/0013* (2020.02); *B60J 1/02* (2013.01); *B60J 1/08* (2013.01); *B60J 1/18* (2013.01); *B60J 3/04* (2013.01); *B60W 60/00253* (2020.02); *G01C 21/3453* (2013.01); *G02F 1/163* (2013.01); *G05B 19/4155* (2013.01); *G06Q 50/30* (2013.01); *G02F 1/137* (2013.01); *G02F 1/1334* (2013.01); *G05B 2219/45025* (2013.01)

(58) Field of Classification Search
CPC ........ B60W 60/0013; B60W 60/00253; B60J 1/02; B60J 1/08; B60J 1/18; B60J 3/04; G02F 1/163; G02F 1/1334; G02F 1/137; G05B 19/4155; G05B 2219/45025; G06Q 50/30; G01C 21/3453
USPC ......................................................... 701/25
See application file for complete search history.

(56) References Cited

U.S. PATENT DOCUMENTS

| | | |
|---|---|---|
| 9,146,438 B2 | 9/2015 | Mitchell et al. |
| 9,348,492 B1 | 5/2016 | Penilla et al. |
| 9,409,464 B2 | 8/2016 | Tomkins et al. |

(Continued)

OTHER PUBLICATIONS

PCT International Search Report and Written Opinion issued in PCT/US2021/048161 dated Dec. 21, 2021; 11 pages.

*Primary Examiner* — Mahmoud S Ismail
(74) *Attorney, Agent, or Firm* — Akona IP

(57) ABSTRACT

The present disclosure provides a method comprising receiving a rideshare request from a user, the rideshare request including a destination; transporting the passenger to the destination using an autonomous vehicle (AV) having a plurality of windows comprising electrically switchable smart glass; during the transporting, monitoring a metric related to arrival of the AV at the destination; and untinting the windows when the monitored metric has a prescribed relationship to a threshold value.

20 Claims, 5 Drawing Sheets

(51) Int. Cl.
    *G02F 1/1334* (2006.01)
    *G02F 1/137* (2006.01)

(56) References Cited

U.S. PATENT DOCUMENTS

| | | |
|---|---|---|
| 10,059,175 B2 | 8/2018 | Cuddihy et al. |
| 10,479,172 B2 | 11/2019 | Jabour et al. |
| 10,576,809 B2 | 3/2020 | Lota |
| 2003/0210355 A1 | 11/2003 | Dao |
| 2019/0152303 A1 | 5/2019 | Ghannam et al. |
| 2019/0263231 A1 | 8/2019 | Jabour et al. |
| 2020/0269663 A1* | 8/2020 | Urano .................. G05D 1/0088 |

* cited by examiner

ADJUSTABLE AUTOMATIC WINDOW TINTING FOR AUTONOMOUS VEHICLES

TECHNICAL FIELD OF THE DISCLOSURE

The present disclosure relates generally to autonomous vehicles (AVs) and, more specifically, to systems and methods for implementing adjustable automatic window tinting for AVs.

BACKGROUND

In electric vehicles, window tinting has been shown to increase the range of the vehicle by nearly 20% in hot environments. Window tinting can also reduce strain on passengers' eyes and increase privacy for passengers. However, there are cases in which window tinting is not preferable, such as when a passenger needs to look out the window for their drop-off location or in cases in which a person needs visibility into the AV without having to open the door.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DESCRIPTION OF EXAMPLE EMBODIMENTS OF THE DISCLOSURE

Figure 1:
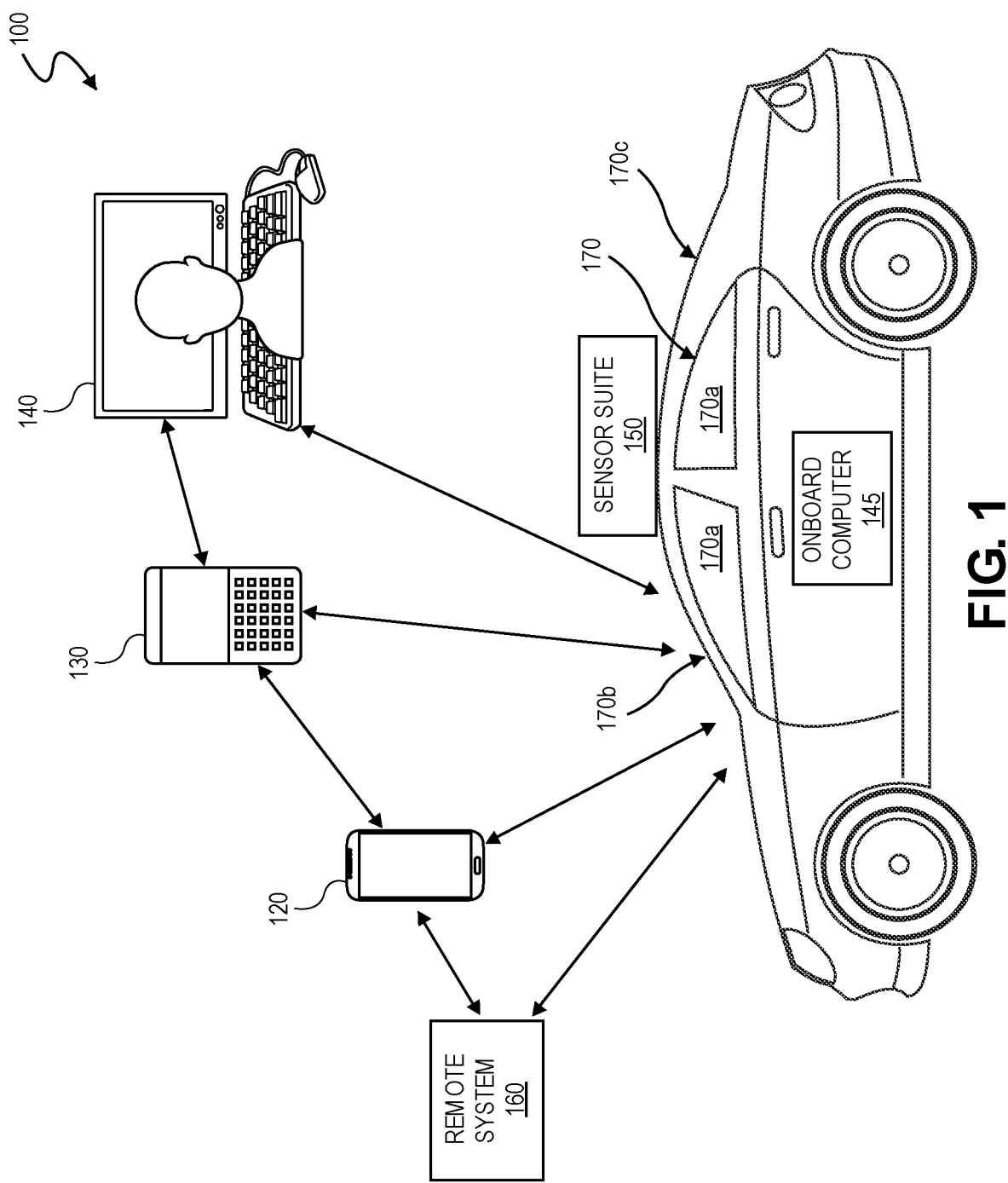
FIG. 1 is a block diagram illustrating an example autonomous vehicle (AV) in which an adjustable automatic window tinting (AAWT) system according to some embodiments of the present disclosure may be implemented.

The systems, methods and devices of this disclosure each have several innovative aspects, no single one of which is solely responsible for the all of the desirable attributes disclosed herein. Details of one or more implementations of the subject matter described in this specification are set forth in the description below and the accompanying drawings.

As will be appreciated by one skilled in the art, aspects of the present disclosure described herein may be embodied in various manners (e.g., as a method, a system, a computer program product, or a computer-readable storage medium). Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by one or more hardware processing units, e.g. one or more microprocessors, of one or more computers. In various embodiments, different steps and portions of the steps of each of the methods described herein may be performed by different processing units. Furthermore, aspects of the present disclosure may take the form of a computer program product embodied in one or more computer readable medium(s), preferably non-transitory, having computer readable program code embodied, e.g., stored, thereon. In various embodiments, such a computer program may, for example, be downloaded (updated) to the existing devices and systems (e.g. to the existing system devices and/or their controllers, etc.) or be stored upon manufacturing of these devices and systems.

The following detailed description presents various descriptions of specific certain embodiments. However, the innovations described herein can be embodied in a multitude of different ways, for example, as defined and covered by the claims and/or select examples. In the following description, reference is made to the drawings in which like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

Other features and advantages of the disclosure will be apparent from the following description and the claims.

In accordance with features of embodiments described herein, a "smart" window tinting system for an AV may be implemented using electrochromic windows comprising conductive glass windows the transmissivity (or opacity) of each of which is adjustable in response to an applied electrical current, with the transmissivity or opacity of the window (i.e., the level or amount of tint, measured in terms of visible light transmission percentage, or VLT %) being dependent of the magnitude of the applied electrical current. In various embodiments, the window tint may be controllable by a passenger, by a fleet management system, and/or by the AV itself.

In certain embodiments, passengers may be able to control an amount or level of window tinting using a passenger interface, which may include a ride share app installed on a mobile communications device of the user, or an interface on the AV itself, such as a touch screen or physical button or dial. In certain embodiments, certain preferences of the user with regard to window tint may be saved in the user's profile such that the window tinting of the AV's windows would be automatically adjusted upon pick up of the user. It will be recognized that user preferences may indicate a default setting, as well as additional "conditional" settings, nonlimiting examples of which include settings that correspond to time of day (e.g., a first setting for daylight hours and a second setting for nighttime hours), temperature (e.g., a first setting for temperature in excess of a threshold and a second setting for temperature below the threshold), or location (e.g., a first setting for driving in urban areas and a second setting for rural areas), to name a few. Additionally, preferences of a particular user may be learned over time, such that window tinting is set to a default level for the passenger each time the passenger is picked up for a ride.

In other embodiments, a level of window tinting may be controlled remotely; for example, by a fleet management system. In such embodiments, the fleet management system may adjust the window tint of an AV based on the AV's mission (e.g., delivery vs. rideshare), planned route, time of day, weather conditions, vehicle information and/or passenger information and preferences. The tinting may also be changed by the fleet management system based on a detected activity of the AV. For example, when the AV is parked, the windows may be darkened to deter break-ins or reduce solar loading on the interior surfaces of the AV. When the AV is undergoing maintenance, the tinting may be automatically reduced to increase visibility of maintenance technicians into and within the AV.

In yet another embodiment, the AV itself may control a level of window tinting. In certain embodiments, the AV could automatically adjust window tinting in response to and/or based on the position or location of the sun relative to where passengers are seated inside the AV, solar load, ambient temperature, vehicle occupancy, and other factors. Additionally, the AV could automatically adjust the window tinting in response to certain circumstances, such as reducing the window tint as the AV approaches the passenger's destination to allow passengers' eyes to adjust to the ambient environment before they disembark from the AV and to alert the passenger that the AV is approaching the destination. Still further, the AV could automatically adjust the window tinting in response to HVAC load of the AV, with the window tint being automatically adjusted in response to the HVAC load exceeding or falling below a predetermined threshold.

In accordance with features of embodiments described herein, the cameras and sensors of the AV may be used to accumulate information that may be used to adjust the level of window tint. For example, camera images and sensor data may indicate that the AV is being pulled over by a police vehicle, in which case, the windows would automatically untint so that a police officer can see inside the AV when the officer approaches. As another example, the camera images and sensor data may indicate that one or more passengers are wearing sunglasses, indicating that the window tint should be increased for passenger comfort, or are reading, indicating that the window tint should be decreased to provide sufficient light for that activity. As yet another example, the camera images and sensor data may indicate that one or more passengers appears to be experiencing motion sickness, in which case the window tinting may be adjusted to address the issue.

In another aspect, information concerning road conditions along a route being traversed may be used to automatically adjust the level of window tint. For example, window tinting may be adjusted to proactively inhibit motion sickness along portions of the route the conditions of which are particularly conducive to causing motion sickness.

Embodiments described herein may further be used to facilitate communication of information and/or direct or guide a user's interaction with the vehicle using window tinting. For example, when the service being provided is a delivery, the window nearest the location of the package within the AV may be untinted, with the other windows remaining tinted, to signal to a person retrieving the package the location thereof within the vehicle. Alternatively, in the same delivery scenario, the tint of window nearest the location of the package may be turned on and off (corresponding to blinking or flashing) to draw the attention of the person retrieving the package. Additionally, windows may be segmented, with each segment being separately controllable, such that a pattern (e.g., selectable by a user) may be displayed on the window. Similarly, segmented windows may be tinted in a gradient pattern, proceeding from dark tint to light or no tint from top to bottom (or bottom to top), such that the sun may be blocked with strategically located darker tint on a window, while not blocking all light from being transmitted through the window.

Feedback information concerning the success of the applied tinting in addressing a particular issue may be provided to the AAWT system and used for calibration purposes. Such information may be provided directly by the user/passenger or may be determined from corresponding image and sensor data and/or AV data.

As shown in FIG. 1, a system 100 embodying features described herein includes an autonomous vehicle 110 including a passenger interface 120, a vehicle coordinator 130, and/or a remote expert interface 140. In certain embodiments, the remote expert interface 140 allows a non-passenger entity to set and/or modify the behavior settings of the autonomous vehicle 110. The non-passenger entity may be different from the vehicle coordinator 130, which may be a server.

A remote facility 160, which may comprise a central office or backoffice facility, may also be provided for providing the autonomous vehicle 110 (and particularly, the onboard computer 145) with a number of different system backend functions. The remote facility 160 may include one or more switches, servers, databases, live advisors, and/or an automated voice response system ("VRS"). Remote facility 160 may include any or all of the aforementioned components, which may be coupled to one another via a wired or wireless local area network (LAN). Remote facility 160 may receive and transmit data via one or more appropriate devices and network from and to the autonomous vehicle 110, such as by wireless systems, such as 882.11x, General Packet Radio Service (GPRS), and the like. A database at the remote facility 160 can store account information such as subscriber authentication information, vehicle identifiers, profile records, behavioral patterns, and other pertinent subscriber information. The remote facility 160 may also include a database of roads, routes, locations, etc., comprising a service area permitted for use by autonomous vehicle 110. The remote facility 160 may communicate with the autonomous vehicle 110 to provide route guidance in response to a request received from the vehicle.

For example, as will be described in greater detail below, the remote facility 160 may receive and store destination data and images for use in implementing aspects of the AAWT system described herein. Additionally, autonomous vehicles, such as the autonomous vehicle 110, may, in the course of determining a navigation route, receive instructions from the remote facility 160 regarding which roads or portions thereof, if any, are appropriate for use under certain circumstances, as well as which drop-off point should be used. Such instructions may be based in part on information received from the autonomous vehicle 110 or other autonomous vehicles regarding road and environmental conditions Accordingly, remote facility 160 may receive information regarding the roads/routes/environmental conditions generally in real-time from one or more vehicles comprising a rideshare service provider's fleet.

The system 100 functions to enable an autonomous vehicle 110 to modify and/or set a driving behavior in response to parameters set by vehicle passengers (e.g., via the passenger interface 120, which may include a user profile) and/or other interested parties (e.g., via the vehicle coordinator 130 or remote expert interface 140). Driving behavior of an autonomous vehicle may be modified according to explicit input or feedback (e.g., a passenger specifying a maximum speed or a relative comfort level), implicit input or feedback (e.g., a passenger's heart rate), or any other suitable data or manner of communicating driving behavior preferences.

The autonomous vehicle 110 is preferably a fully autonomous automobile, but may additionally or alternatively be any semi-autonomous or fully autonomous vehicle; e.g., a boat, an unmanned aerial vehicle, a driverless car, etc. Additionally, or alternatively, the autonomous vehicles may be vehicles that switch between a semi-autonomous state and a fully autonomous state and thus, some autonomous vehicles may have attributes of both a semi-autonomous vehicle and a fully autonomous vehicle depending on the state of the vehicle.

The autonomous vehicle 110 preferably includes a throttle interface that controls an engine throttle, motor speed (e.g., rotational speed of electric motor), or any other movement-enabling mechanism; a brake interface that controls brakes of the autonomous vehicle (or any other movement-retarding mechanism); and a steering interface that controls steering of the autonomous vehicle (e.g., by changing the angle of wheels of the autonomous vehicle). The autonomous vehicle 110 may additionally or alternatively include interfaces for control of any other vehicle functions; e.g., windshield wipers, headlights, turn indicators, air conditioning, etc.

In addition, the autonomous vehicle 110 preferably includes an onboard computer 145 and a sensor suite 150 (e.g., computer vision ("CV") system, Light Detection and Ranging (LIDAR), Radio Detection and Ranging (RADAR), wheel speed sensors, Global Positioning System (GPS), cameras, and a variety of other sensors). The onboard computer 145 functions to control the autonomous vehicle 110 and processes sensed data from the sensor suite 150 and/or other sensors in order to determine the state of the autonomous vehicle 110. Based upon the vehicle state and programmed instructions, the onboard computer 145 preferably modifies or controls driving behavior of the autonomous vehicle 110.

Driving behavior may include any information relating to how an autonomous vehicle drives (e.g., actuates brakes, accelerator, steering) given a set of instructions (e.g., a route or plan). Driving behavior may include a description of a controlled operation and movement of an autonomous vehicle and the manner in which the autonomous vehicle applies traffic rules during one or more driving sessions. Driving behavior may additionally or alternatively include any information about how an autonomous vehicle calculates routes (e.g., prioritizing fastest time vs. shortest distance), other autonomous vehicle actuation behavior (e.g., actuation of lights, windshield wipers, traction control settings, etc.) and/or how an autonomous vehicle responds to environmental stimulus (e.g., how an autonomous vehicle behaves if it is raining, or if an animal jumps in front of the vehicle). Some examples of elements that may contribute to driving behavior include acceleration constraints, deceleration constraints, speed constraints, steering constraints, suspension settings, routing preferences (e.g., scenic routes, faster routes, no highways), lighting preferences, action profiles (e.g., how a vehicle turns, changes lanes, or performs a driving maneuver), and action frequency constraints (e.g., how often a vehicle changes lanes).

The onboard computer 145 functions to control the operations and functionality of the autonomous vehicles 110 and processes sensed data from the sensor suite 150 and/or other sensors in order to determine states of the autonomous vehicles no. Based upon the vehicle state and programmed instructions, the onboard computer 145 preferably modifies or controls behavior of autonomous vehicles 110. The onboard computer 145 is preferably a general-purpose computer adapted for input/output I/O communication with vehicle control systems and sensor systems, but may additionally or alternatively be any suitable computing device. The onboard computer 145 is preferably connected to the Internet via a wireless connection (e.g., via a cellular data connection). Additionally or alternatively, the onboard computer 145 may be coupled to any number of wireless or wired communication systems.

The sensor suite 150 preferably includes localization and driving sensors; e.g., photodetectors, cameras, RADAR, Sound Navigation and Ranging (SONAR), LIDAR, GPS, inertial measurement units (IMUs), accelerometers, microphones, strain gauges, pressure monitors, barometers, thermometers, altimeters, etc.

In certain embodiments, information collected by autonomous vehicles, such as autonomous vehicle 110, may be provided to the remote facility 160, which may establish a database or map of routes in a given area or region where use of an autonomous driving system may be permitted. Information may be collected from vehicles in real-time, i.e., as the vehicle(s) traverses the route(s) in question. Information may be analyzed by a central office of the remote facility 160 in real-time, or on a periodic basis. The information may be provided to vehicles collectively in the area, e.g., by way of a central database or map. For example, vehicles may pull route information from the database/map to determine appropriate route(s) for use of an autonomous driving system in any manner that is convenient. In some examples, a vehicle telematics unit may selectively communicate with the remote facility to determine whether a route may be used with an autonomous driving system. In accordance with another aspect of the invention, there is provided a system for communicating with a plurality of vehicles may include a plurality of telematics units installed into each of the vehicles. The telematics units are configured to collect route information as the vehicles are traveling along a vehicle route.

As shown in FIG. 1, AV 100 includes a plurality of windows 170 including one or more side windows, represented in FIG. 100 by side windows 170a, a windshield 170b, and a rear window 170c. In accordance with features of embodiments described herein, each of the windows 170 comprise electrically switchable smart glass, the light transmission properties of which are altered when an electrical signal is applied. In particular, electrically switchable smart glass is switchable from transparent (allowing all wavelengths of light to pass through) to translucent (blocking some or all wavelengths of light from passing through) and back in response to an electrical signal. In certain embodiments, the electrically switchable smart glass comprising windows 700 is implemented using electrochromic or polymer-dispersed liquid crystal (PDLC) technology. In particular, the electrically switchable smart glass is implemented using a technology that enables varying degrees of opacity/transmissivity between fully transparent and fully opaque depending on the electrical signal applied thereto.

Figure 2:
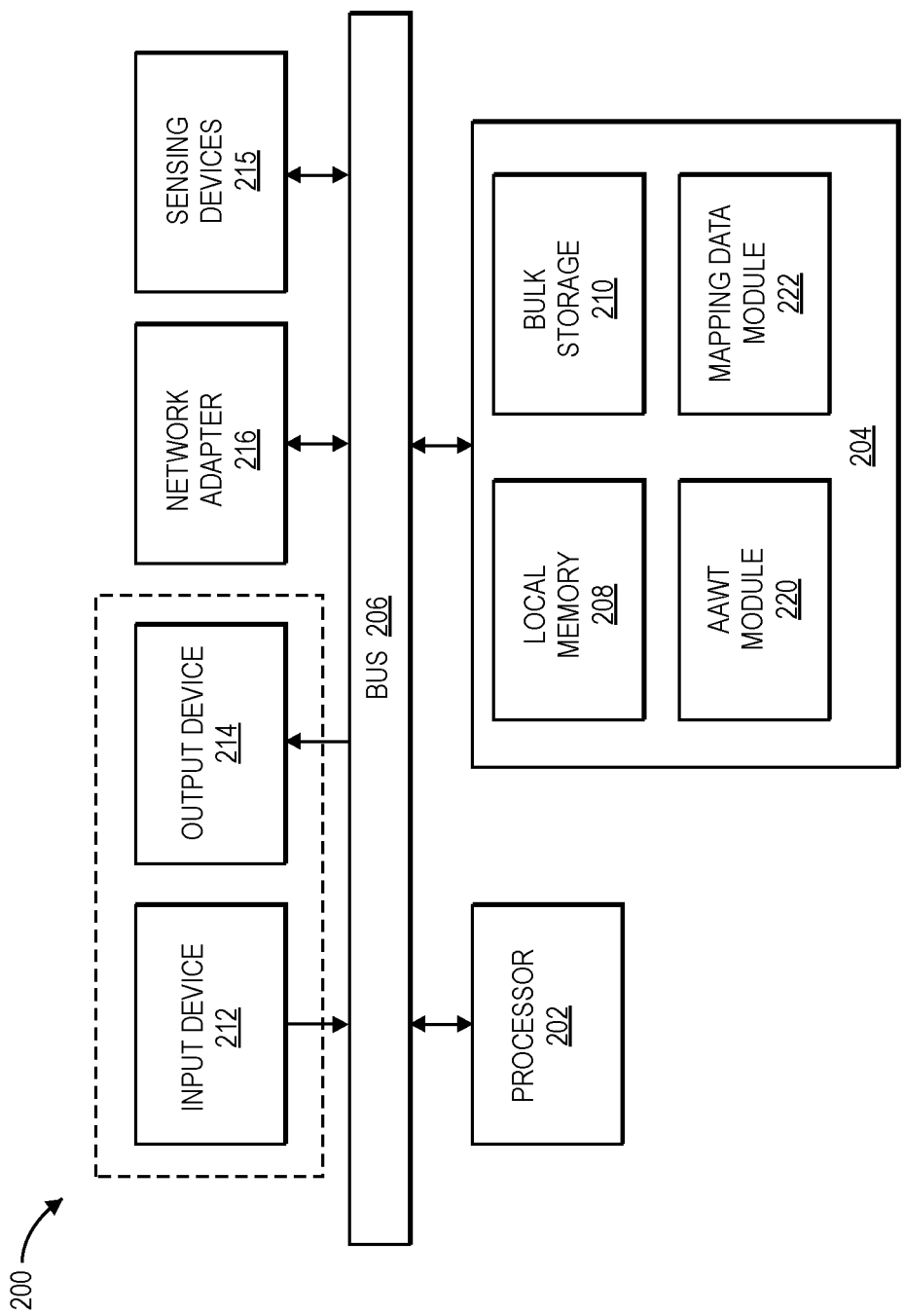
FIG. 2 is a block diagram illustrating an example AAWT system according to some embodiments of the present disclosure.

FIG. 2 is a block diagram illustrating an example system 200 that may be configured to implement at least portions of an AAWT system for an autonomous vehicle, such as the autonomous vehicle 110, in accordance with embodiments described herein, and more particularly as shown in the FIGURES described hereinabove. Part or all of the AAWT system 200 may be implemented as a sensor suite, such as the sensor suite 150, and/or an onboard computer, such as onboard computer 145, and/or a remote system, such as remote facility 160. As shown in FIG. 2, the AAWT system 200 may include at least one processor 202, e.g. a hardware processor 202, coupled to memory elements 204 through a system bus 206. As such, the system may store program code and/or data within memory elements 204. Further, the processor 202 may execute the program code accessed from the memory elements 204 via a system bus 206. In one aspect, the system may be implemented as a computer that is suitable for storing and/or executing program code (e.g., onboard computer 145). It should be appreciated, however, that the system 200 may be implemented in the form of any system including a processor and a memory that is capable of performing the functions described in this disclosure.

In some embodiments, the processor 202 can execute software or an algorithm to perform the activities as discussed in this specification; in particular, activities related to an AAWT system for an autonomous vehicle in accordance with embodiments described herein. The processor 202 may include any combination of hardware, software, or firmware providing programmable logic, including by way of non-limiting example a microprocessor, a digital signal processor (DSP), a field-programmable gate array (FPGA), a programmable logic array (PLA), an integrated circuit (IC), an application specific IC (ASIC), or a virtual machine processor. The processor 202 may be communicatively coupled to the memory element 204, for example in a direct-memory access (DMA) configuration, so that the processor 202 may read from or write to the memory elements 204.

In general, the memory elements 204 may include any suitable volatile or non-volatile memory technology, including double data rate (DDR) random access memory (RAM), synchronous RAM (SRAM), dynamic RAM (DRAM), flash, read-only memory (ROM), optical media, virtual memory regions, magnetic or tape memory, or any other suitable technology. Unless specified otherwise, any of the memory elements discussed herein should be construed as being encompassed within the broad term "memory." The information being measured, processed, tracked or sent to or from any of the components of the system 200 could be provided in any database, register, control list, cache, or storage structure, all of which can be referenced at any suitable timeframe. Any such storage options may be included within the broad term "memory" as used herein. Similarly, any of the potential processing elements, modules, and machines described herein should be construed as being encompassed within the broad term "processor." Each of the elements shown in the present figures may also include suitable interfaces for receiving, transmitting, and/or otherwise communicating data or information in a network environment so that they can communicate with, for example, a system having hardware similar or identical to another one of these elements.

In certain example implementations, mechanisms for implementing an AAWT system for an autonomous vehicle as outlined herein may be implemented by logic encoded in one or more tangible media, which may be inclusive of non-transitory media, e.g., embedded logic provided in an ASIC, in DSP instructions, software (potentially inclusive of object code and source code) to be executed by a processor, or other similar machine, etc. In some of these instances, memory elements, such as e.g. the memory elements 204 shown in FIG. 2, can store data or information used for the operations described herein. This includes the memory elements being able to store software, logic, code, or processor instructions that are executed to carry out the activities described herein. A processor can execute any type of instructions associated with the data or information to achieve the operations detailed herein. In one example, the processors, such as e.g. the processor 202 shown in FIG. 2, could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., an FPGA, a DSP, an erasable programmable read-only memory (EPROM), an electrically erasable programmable read-only memory (EEPROM)) or an ASIC that includes digital logic, software, code, electronic instructions, or any suitable combination thereof.

The memory elements 204 may include one or more physical memory devices such as, for example, local memory 208 and one or more bulk storage devices 210. The local memory may refer to RAM or other non-persistent memory device(s) generally used during actual execution of the program code. A bulk storage device may be implemented as a hard drive or other persistent data storage device. The processing system 200 may also include one or more cache memories (not shown) that provide temporary storage of at least some program code in order to reduce the number of times program code must be retrieved from the bulk storage device 210 during execution.

As shown in FIG. 2, the memory elements 204 may store a window tinting adjustment module 220 and a mapping data module 222. In various embodiments, the modules 220, 222, may be stored in the local memory 208, the one or more bulk storage devices 210, or apart from the local memory and the bulk storage devices. It should be appreciated that the system 200 may further execute an operating system (not shown in FIG. 2) that can facilitate execution of the modules 220, 222. The modules 220, 222, being implemented in the form of executable program code and/or data, can be read from, written to, and/or executed by the system 200, e.g., by the processor 202. Responsive to reading from, writing to, and/or executing one of the modules 220, 222, the system 200 may be configured to perform one or more operations or method steps described herein.

Input/output (I/O) devices depicted as an input device 212 and an output device 214, optionally, may be coupled to the system. Examples of input devices may include, but are not limited to, a keyboard, a pointing device such as a mouse, or the like. Examples of output devices may include, but are not limited to, a monitor or a display, speakers, or the like. In some implementations, the system may include a device driver (not shown) for the output device 214. Input and/or output devices 212, 214 may be coupled to the system 200 either directly or through intervening I/O controllers. Additionally, sensing devices 215, may be coupled to the system 200. Examples of sensing devices 215 may include, but are not limited to, cameras (located inside and/or outside the vehicle), LIDARs, RADARS, scales, quick response (QR) code readers, bar code readers, radio frequency (RF) sensors, and others. Sensing devices 215 may be coupled to the system 200 either directly or through intervening controllers and/or drivers.

Cameras may be implemented using high-resolution imagers with fixed mounting and field of view. LIDARs may be implemented using scanning LIDARs with dynamically configurable field of view that provides a point-cloud of the region intended to scan. RADARs may be implemented using scanning RADARs with dynamically configurable field of view.

In an embodiment, the input and the output devices may be implemented as a combined input/output device (illustrated in FIG. 2 with a dashed line surrounding the input device 212 and the output device 214). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 216 may also, optionally, be coupled to the system 200 to enable it to become coupled to other systems, computer systems, remote network devices, and/or remote storage devices through intervening private or public networks. The network adapter may comprise a data receiver for receiving data that is transmitted by said systems, devices and/or networks to the system 200, and a data transmitter for transmitting data from the system 200 to said systems, devices and/or networks. Modems, cable modems, and Ethernet cards are examples of different types of network adapter that may be used with the system 200.

Figure 3:
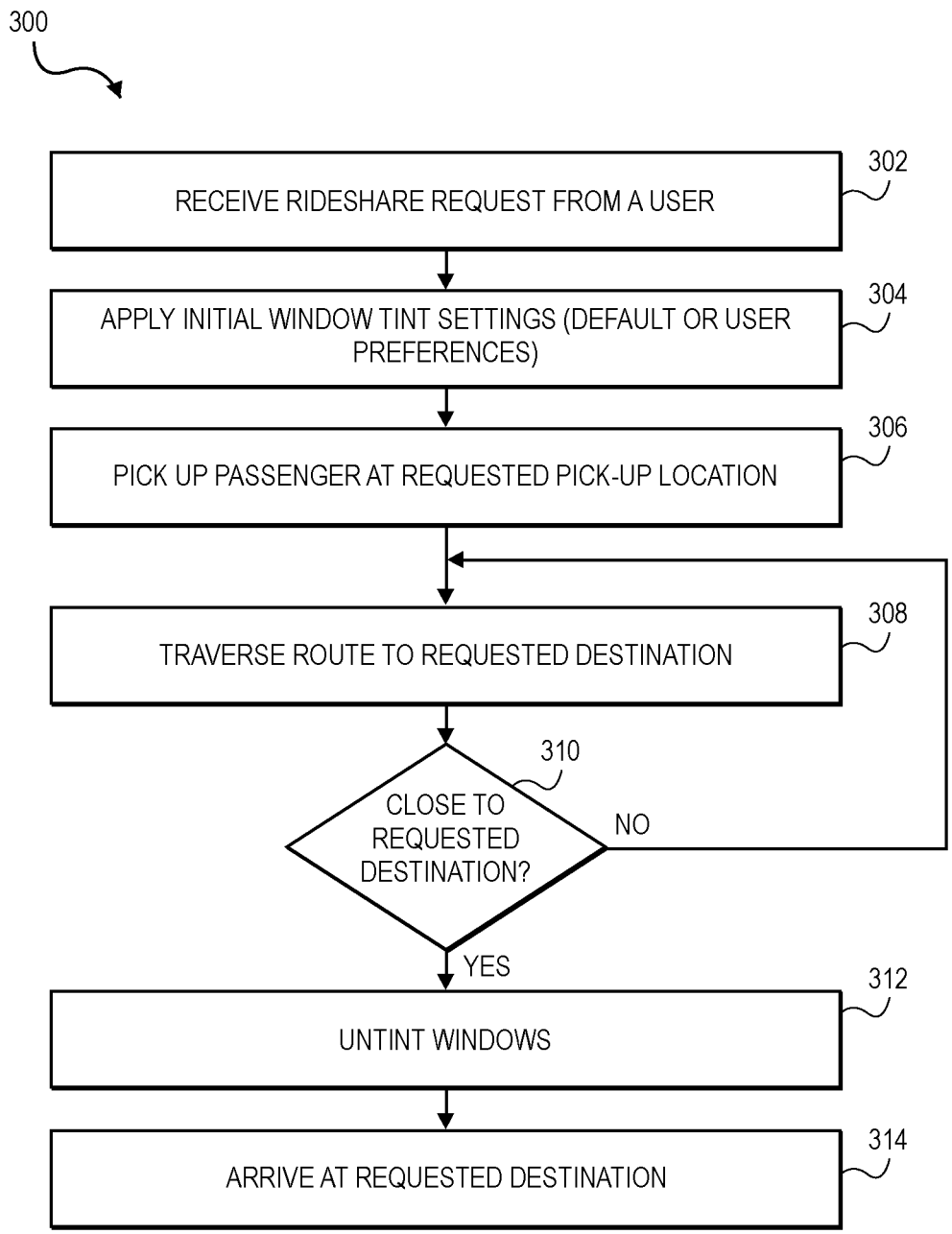
FIG. 3 is a flowchart illustrating an example method that may be performed by an AAWT system to untint the windows of an AV providing a rideshare service for a user as the AV approaches the user's destination according to some embodiments of the present disclosure.

FIG. 3 is a flowchart illustrating an example method 300 that may be performed by an AAWT system, such as the system 200, to untint the windows of an AV, such as the AV 100, providing a rideshare service for a user as the AV approaches the user's destination.

In step 302, a rideshare request is received from a user. The rideshare request may be made by the user via a passenger interface, such as a rideshare app installed on a mobile communications device.

In step 304, the windows of the AV are tinted to an initial level, which may be in accordance with a system default level or with specified user preferences expressed in the user's profile.

In step 306, the AV arrives at the pick-up location to pick up the user.

In step 308, the AV proceeds along a selected route to a destination requested by the user.

In step 310, a determination is made whether the AV is proximate the destination. This step may be performed by comparing a distance-to-destination with a predetermined threshold distance, such that when the distance-to-destination falls below the predetermined threshold distance, the AV is deemed to be "proximate" the destination. Alternatively, this step may be performed by comparing a time-to-destination with a predetermined threshold time, such that when the time-to-destination falls below the predetermined threshold time, the AV is deemed to be proximate the destination. When it is determined that the AV is proximate the destination, execution proceeds to step 312.

In step 312, all of the windows of the AV are untinted and remain untinted until the AV arrives at the requested destination (step 314) and the user disembarks the AV.

Figure 4:
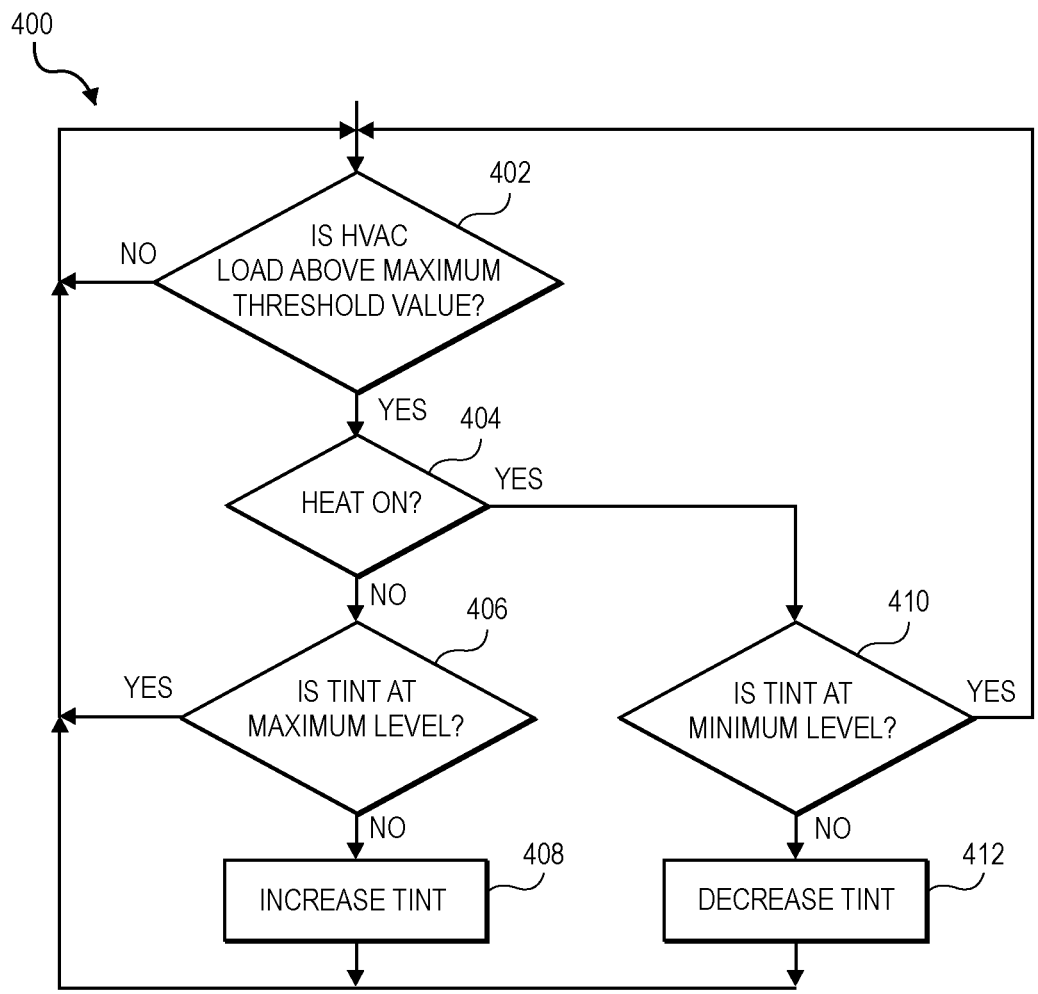
FIG. 4 is a flowchart illustrating an example method that may be performed by an AAWT system to automatically adjust the tint of the windows of an AV in response to HVAC load according to some embodiments of the present disclosure.

FIG. 4 is a flowchart illustrating an example method 400 that may be performed by an AAWT system, such as the system 200, to automatically adjust the tint of the windows of an AV, such as the AV 100, in response to HVAC load of the AV.

In step 402, a determination is made whether the HVAC load of the AV has met or exceeded a predetermined threshold. If not, execution remains at step 402; otherwise, execution proceeds to step 404.

In step 404, a determination is made whether the heating portion of the AV's HVAC system is on. If not, the cooling portion of the AV's HVAC system is presumably on and execution proceeds to step 406.

In step 406, a determination is made whether the windows are tinted to a maximum level. If so, meaning that the windows cannot be tinted further, execution returns to step 402; otherwise, execution proceeds to step 408.

In step 408, the window tint level is increased a predetermined amount. Execution then returns to step 402.

Returning to step 404, if it determined that the heating portion of the AV's HVAC system is on, execution proceeds to step 410.

In step 410, a determination is made whether the windows are tinted to a minimum level. If so, meaning that the windows cannot be untinted further, execution returns to step 402; otherwise, execution proceeds to step 412.

In step 412, the window tint level is decreased a predetermined amount. Execution then returns to step 402.

Figure 5:
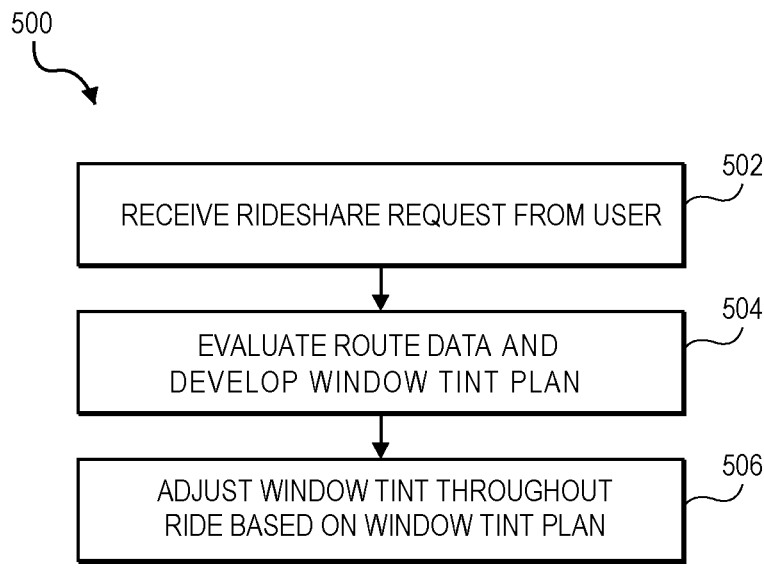
FIG. 5 is a flowchart illustrating an example method that may be performed by an AAWT system to automatically adjust the tint of the windows of an AV in response to user comfort according to some embodiments of the present disclosure.

FIG. 5 is a flowchart illustrating an example method 500 that may be performed by an AAWT system, such as the system 200, to proactively automatically adjust the tint of the windows of an AV, such as the AV 100, in accordance with conditions along a rideshare route between a pick-up location and a destination.

In step 502, a rideshare request, specifying a pick-up location and a destination, is received from a user.

In step 504, route data for a selected route between the pick-up location and the destination is evaluated by route segment. In some embodiments, the route data may include for each segment: road conditions (e.g., winding and/or bumpy roads may contribute to motion sickness of a passenger), whether the segment is urban or rural, whether the segment involves highway or city driving, whether the segment is shaded or exposed, etc. The route data is used to develop a window tinting plan for the route. The window tinting plan may involve tinting individual windows differently and changing tint along the route in accordance with the route segment data and time of day the route segment will be traversed.

In step 506, once the ride commences, the window tinting plan is implemented such that window tinting is proactively adjusted throughout the ride based on the window tinting plan.

Figure 6:
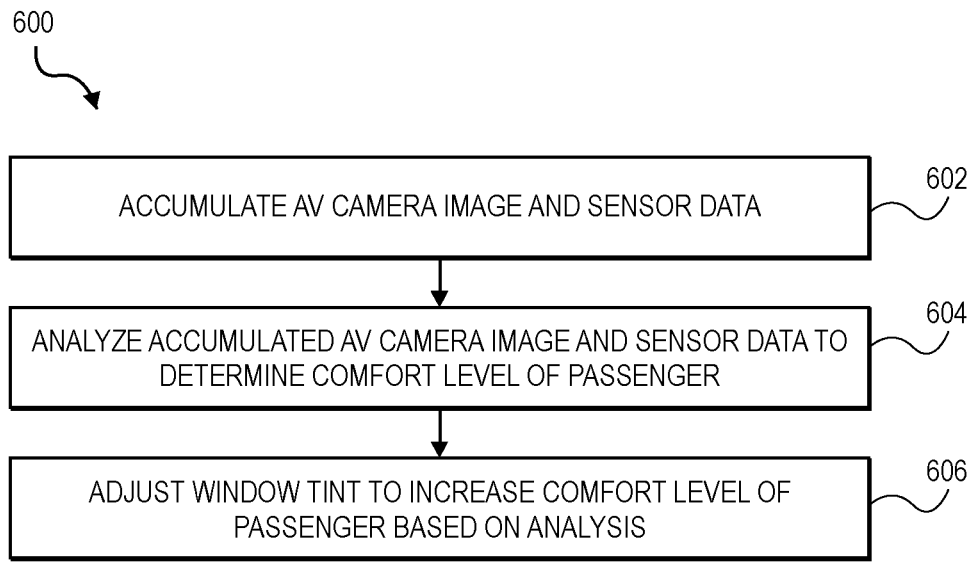
FIG. 6 is a flowchart illustrating an example method that may be performed by an AAWT system to proactively automatically adjust the tint of the windows of an AV in accordance with route conditions according to some embodiments of the present disclosure.

FIG. 6 is a flowchart illustrating an example method 600 that may be performed by an AAWT system, such as the system 200, to automatically adjust the tint of the windows of an AV, such as the AV 100, to increase the comfort level of a passenger during provision of a rideshare service.

In step 602, image and sensor data is accumulated from one or more of the AV's cameras and sensors.

In step 604, the accumulated image and sensor data are analyzed to determine and/or assess a comfort level of a passenger inside the AV. For example, if the passenger is wearing sunglasses, increasing the window tint or using a gradient tint may increase the passenger's comfort. If the passenger appears to be engaged in looking at the scenery, decreasing the window tint level of all of the windows or just the window through which the passenger is looking may increase the passenger's enjoyment of the ride.

In step 606, the window tint is adjusted to increase the comfort level of the passenger based on the analysis.

Figure 7:
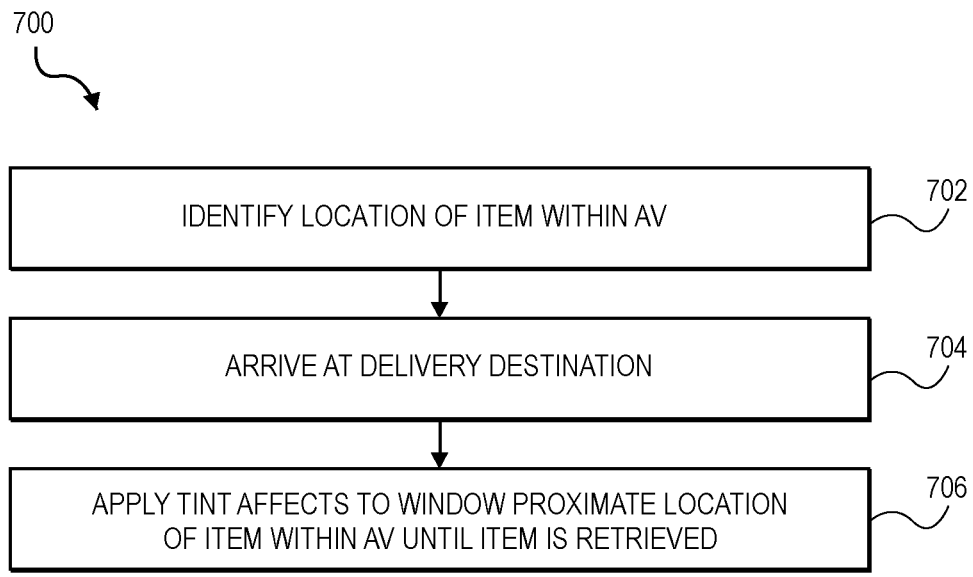
FIG. 7 is a flowchart illustrating an example method that may be performed by an AAWT system to automatically adjust the tint of the windows of an AV to communicate information to a user receiving a delivery of an item via the AV according to some embodiments of the present disclosure.

FIG. 7 is a flowchart illustrating an example method 700 that may be performed by an AAWT system, such as the system 200, to automatically adjust the tint of the windows of an AV, such as the AV 100, to communicate information to a user receiving a delivery of an item via the AV.

In step 702, the location of the item within the AV is identified. This may be performed, for example, using weight sensors to determine where the item is situated.

In step 704, the AV arrives at the destination.

In step 706, upon arrival at the destination, a tinting effect is applied to the window nearest the identified location of the item to draw the user's attention to that area of the AV. For example, intermittent tinting may be applied such that the window appear to be flashing or blinking. Alternatively, a tinting pattern (e.g., a checkerboard) or design may be applied to the window to draw the user's attention. As another example, the window nearest the identified location may be untinted and the rest of the windows fully tinted, thereby to draw the attention of the user.

Example 1 is a method including receiving a rideshare request from a user, the rideshare request including a destination; transporting the passenger to the destination using an autonomous vehicle (AV) having a plurality of windows comprising electrically switchable smart glass; during the transporting, monitoring a metric related to arrival of the AV at the destination; and untinting the windows when the monitored metric has a prescribed relationship to a threshold value.

In Example 2, the method of Example 1 may further include the monitored metric comprising a time-to-destination, wherein the time-to-destination comprises an amount of time it will take the AV to arrive at the destination.

In Example 3, the method of any of Examples 1-2 may further include, during the transporting, comparing the time-to-destination with a threshold time, wherein the untinting the windows comprises untinting the windows when the time-to-destination falls below the threshold time.

In Example 4, the method of any of Examples 1-3 may further include the monitored metric comprising a distance-to-destination, wherein the distance-to-destination comprises a distance the AV will have to travel before arriving at the destination.

In Example 5, the method of any of Examples 1-4 may further include, during the transporting, comparing the distance-to-destination with a threshold distance, wherein the untinting the windows comprises untinting the windows when the distance-to-destination falls below the threshold distance.

In Example 6, the method of any of Examples 1-5 may further include the untinting the windows comprising applying an electrical signal to the windows.

In Example 7, the method of any of Examples 1-6 may further include the electrically switchable smart glass comprising at least one of an electrochromic device and a polymer-dispersed liquid crystal (PDLC) device.

In Example 8, the method of any of Examples 1-7 may further include the windows comprising at least one of a windshield, a rear window, and a side window.

Example 9 is a method including receiving a rideshare request from a user, the rideshare request including a destination; transporting the passenger to the destination using an autonomous vehicle (AV) having a plurality of windows comprising electrically switchable smart glass a level of tint of which may be changed by applying an electrical signal thereto; and untinting the windows at least one of a predetermined time or a predetermined distance before the AV arrives at the destination.

In Example 10, the method of Example 9 may further include, during the transporting, monitoring a time-to-destination, wherein the time-to-destination comprises an amount of time it will take the AV to arrive at the destination.

In Example 11, the method of any of Examples 9-10 may further include comparing the time-to-destination with a threshold time; and untinting the windows when the time-to-destination falls below the threshold time.

In Example 12, the method of any of Examples 9-11 may further include, during the transporting, monitoring a distance-to-destination, wherein the distance-to-destination comprises a distance the AV will have to travel before arriving at the destination.

In Example 13, the method of any of Examples 9-12 may further include comparing the distance-to-destination with a threshold distance; and untinting the windows when the distance-to-destination falls below the threshold distance.

In Example 14, the method of any of Examples 9-13 may further include the electrically switchable smart glass being implemented using at least one of electrochromic technology and polymer-dispersed liquid crystal (PDLC) technology.

Example 15 is a system comprising an autonomous vehicle (AV) for providing transportation from a pick-up location to a destination, the AV having a plurality of windows comprising electrically switchable smart glass, wherein a tint level of the electrically switchable smart glass may be changed by applying an electrical signal thereto; and an adjustable automatic window tinting (AAWT) module for causing the windows to be untinted at least one of a predetermined time or a predetermined distance before the AV arrives at the destination.

In Example 16, the system of Example 15 may further include the AAWT module monitoring a time-to-destination during the transportation, wherein the time-to-destination comprises an amount of time it will take the AV to arrive at the destination.

In Example 17, the system of any of Examples 15-16 may further include the AAWT module comparing the time-to-destination with a threshold time; and causing the windows to be untinted when the time-to-destination falls below the threshold time.

In Example 18, the system of any of Examples 15-17 may further include the AAWT module monitoring a distance-to-destination during the transportation, wherein the distance-to-destination comprises a distance the AV will have to travel before arriving at the destination.

In Example 19, the system of any of Examples 15-18 may further include the AAWT module comparing the distance-to-destination with a threshold distance; and causing the windows to be untinted when the distance-to-destination falls below the threshold distance.

In Example 20, the system of any of Examples 15-19 may further include the electrically switchable smart glass comprising at least one of an electrochromic device and a polymer-dispersed liquid crystal (PDLC) device.

Example 21 is a method including, if a heating, ventilation, and air conditioning (HVAC) load of a vehicle has exceeded a predetermined maximum threshold and a heating portion of the HVAC is on, automatically decreasing a tint level of at least one window of the vehicle; and if the HVAC load of the vehicle has exceeded the predetermined maximum threshold and a cooling portion of the HVAC is on, automatically increasing a tint level of at least one window of the vehicle.

Example 22 is a method including receiving a transportation service request specifying an origin and a destination; evaluating a plurality of route segments comprising a route between the origin and the destination to develop a window tinting plan for the route; and, upon commencement of the transportation service, implementing the window tinting plan such that a tint level of at least one window of the vehicle is automatically and proactively adjusted throughout the transportation service based on the window tinting plan.

Example 23 is a method including accumulating image and sensor data accumulated from at least one of a camera associated with a vehicle and a sensor associated with the vehicle; analyzing the accumulated image and sensor data to determine a comfort level of a passenger inside the vehicle; and automatically adjusting a tint level of at least one window of the vehicle in response to the analyzing.

Example 24 is a method comprising identifying a location of an item within a vehicle; and upon arrival of the vehicle at a destination, applying a tinting effect to at least one window of the vehicle proximate the identified location, the tinting effect designed to draw attention of a user outside the vehicle to the identified location.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

In one example embodiment, any number of electrical circuits of the FIGS. may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

In another example embodiment, the electrical circuits of the FIGS. may be implemented as stand-alone modules (e.g., a device with associated components and circuitry configured to perform a specific application or function) or implemented as plug-in modules into application specific hardware of electronic devices. Note that particular embodiments of the present disclosure may be readily included in a system on chip (SOC) package, either in part, or in whole. An SOC represents an IC that integrates components of a computer or other electronic system into a single chip. It may contain digital, analog, mixed-signal, and often radio frequency functions: all of which may be provided on a single chip substrate. Other embodiments may include a multi-chip-module (MCM), with a plurality of separate ICs located within a single electronic package and configured to interact closely with each other through the electronic package. In various other embodiments, the digital filters may be implemented in one or more silicon cores in Application Specific Integrated Circuits (ASICs), Field Programmable Gate Arrays (FPGAs), and other semiconductor chips.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, example embodiments have been described with reference to particular arrangements of components. Various modifications and changes may be made to such embodiments without departing from the scope of the appended claims. The description and drawings are, accordingly, to be regarded in an illustrative rather than in a restrictive sense.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGS. may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the FIGS. and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

It is also important to note that the functions related to contactless current measurement using magnetic sensors, e.g. those summarized in the one or more processes shown in FIGS. illustrate only some of the possible functions that may be executed by, or within, the current measurement systems illustrated in the FIGS. Some of these operations may be deleted or removed where appropriate, or these operations may be modified or changed considerably without departing from the scope of the present disclosure. In addition, the timing of these operations may be altered considerably. The preceding operational flows have been offered for purposes of example and discussion. Substantial flexibility is provided by embodiments described herein in that any suitable arrangements, chronologies, configurations, and timing mechanisms may be provided without departing from the teachings of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. Note that all optional features of the apparatus described above may also be implemented with respect to the method or process described herein and specifics in the examples may be used anywhere in one or more embodiments.

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the Specification, to limit this disclosure in any way that is not otherwise reflected in the appended claims.

What is claimed is:

1. A method comprising:
   transporting a passenger to a requested destination using an autonomous vehicle (AV) having a plurality of windows comprising electrically switchable smart glass;
   during the transporting, monitoring a heating, ventilation, and air conditioning (HVAC) load of the AV;
   subsequent to the HVAC load of the AV exceeding a predetermined threshold value:
      automatically incrementally adjusting a tint level of at least one of the windows; and
      continuing to automatically incrementally adjust the tint level of the at least one window until the HVAC load of the AC no longer exceeds the predetermined threshold value;
   during the transporting, monitoring a metric related to arrival of the AV at the destination; and
   untinting the windows when the monitored metric has a prescribed relationship to a threshold value.

2. The method of claim 1 wherein the monitored metric comprises a time-to-destination, wherein the time-to-destination comprises an amount of time it will take the AV to arrive at the destination.

3. The method of claim 2 further comprising, during the transporting, comparing the time-to-destination with a threshold time, wherein the untinting the windows comprises untinting the windows when the time-to-destination falls below the threshold time.

4. The method of claim 1 wherein the monitored metric comprises a distance-to-destination, wherein the distance-to-destination comprises a distance the AV will have to travel before arriving at the destination.

5. The method of claim 4 further comprising, during the transporting, comparing the distance-to-destination with a threshold distance, wherein the untinting the windows comprises untinting the windows when the distance-to-destination falls below the threshold distance.

6. The method of claim 1 wherein the untinting the windows comprises applying an electrical signal to the windows.

7. The method of claim 1, wherein the electrically switchable smart glass comprises at least one of an electrochromic device and a polymer-dispersed liquid crystal (PDLC) device.

8. The method of claim 1, wherein the windows comprise at least one of a windshield, a rear window, and a side window.

9. A method comprising:
   transporting a passenger to a requested destination using an autonomous vehicle (AV) having a plurality of windows comprising electrically switchable smart glass a level of tint of which may be changed by applying an electrical signal thereto; and
   during the transporting, monitoring a heating, ventilation, and air conditioning (HVAC) load of the AV;
   subsequent to the HVAC load of the AV exceeding a predetermined threshold value:
      automatically incrementally adjusting a tint level of at least one of the windows; and
      continuing to automatically incrementally adjust the tint level of the at least one window until the HVAC load of the AC no longer exceeds the predetermined threshold value.

10. The method of claim 9 further comprising, during the transporting, monitoring a time-to-destination, wherein the time-to-destination comprises an amount of time it will take the AV to arrive at the destination.

11. The method of claim 10 further comprising:
comparing the time-to-destination with a threshold time; and
untinting the windows when the time-to-destination falls below the threshold time.

12. The method of claim 9 further comprising, during the transporting, monitoring a distance-to-destination, wherein the distance-to-destination comprises a distance the AV will have to travel before arriving at the destination.

13. The method of claim 12 further comprising:
comparing the distance-to-destination with a threshold distance; and
untinting the windows when the distance-to-destination falls below the threshold distance.

14. The method of claim 9, wherein the electrically switchable smart glass is implemented using at least one of electrochromic technology and polymer-dispersed liquid crystal (PDLC) technology.

15. A system comprising:
an autonomous vehicle (AV) for providing transportation from a pick-up location to a destination, the AV having a plurality of windows comprising electrically switchable smart glass, wherein a tint level of the electrically switchable smart glass may be incrementally adjusted by applying an electrical signal thereto; and
an adjustable automatic window tinting (AAWT) module for automatically incrementally adjusting a tint level of at least one of the windows subsequent to a heating, ventilation, and air conditioning (HVAC) load of the AV exceeding a predetermined threshold value and continuing to automatically incrementally adjust the tint level of the at least one window until the HVAC load of the AC no longer exceeds the predetermined threshold value.

16. The system of claim 15, wherein the AAWT module further monitors a time-to-destination during the transportation, wherein the time-to-destination comprises an amount of time it will take the AV to arrive at the destination.

17. The system of claim 16, wherein the AAWT module further:
compares the time-to-destination with a threshold time; and
untints the windows when the time-to-destination falls below the threshold time.

18. The system of claim 15, wherein the AAWT module further monitors a distance-to-destination during the transportation, wherein the distance-to-destination comprises a distance the AV will have to travel before arriving at the destination.

19. The system of claim 18 wherein the AAWT module further:
compares the distance-to-destination with a threshold distance; and
untints the windows when the distance-to-destination falls below the threshold distance.

20. The system of claim 15, wherein the electrically switchable smart glass comprises at least one of an electrochromic device and a polymer-dispersed liquid crystal (PDLC) device.

* * * * *